US012762411B2

(12) United States Patent
Ehteshami Bejnordi et al.

(10) Patent No.: US 12,762,411 B2
(45) Date of Patent: Oct. 13, 2026

(54) CHANNEL GATING FOR CONDITIONAL COMPUTATION

(71) Applicant: QUALCOMM Incorporated, San Diego, CA (US)

(72) Inventors: Babak Ehteshami Bejnordi, Amsterdam (NL); Tijmen Pieter Frederik Blankevoort, Amsterdam (NL); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 18/337,462

(22) Filed: Jun. 20, 2023

(65) Prior Publication Data

US 2023/0334324 A1 Oct. 19, 2023

Related U.S. Application Data

(63) Continuation of application No. 16/419,509, filed on May 22, 2019, now abandoned.

(51) Int. Cl.
*G06N 20/00* (2019.01)
*G06N 3/084* (2023.01)

(52) U.S. Cl.
CPC ............ *G06N 3/084* (2013.01); *G06N 20/00* (2019.01)

(58) Field of Classification Search
CPC ............................... G06N 3/084; G06N 20/00
See application file for complete search history.

(56) References Cited

U.S. PATENT DOCUMENTS

2019/0034761 A1* 1/2019 Huang .................. G06V 10/82
2020/0372361 A1 11/2020 Ehteshami Bejnordi et al.

OTHER PUBLICATIONS

Chen, Z. et al, You Look Twice: GaterNet for Dynamic Filter Selection in CNNs, [online] [retrieved Oct. 13, 2021]. Retrieved from Internet:<https://bengio.abracadoudou.com/cv/publications/pdf/chen_2018_arxiv.pdf> (Year: 2018).*

Veit, A., et al, Convolutional Networks with Adaptive Inference Graphs, [retrieved Aug. 8, 2022]. Retrieved from Internet:<https://openaccess.thecvf.com/content_ECCV_2018/html/Andreas_Veit_Convolutional_Networks_with_ECCV_2018_paper.html> (Year: 2018).*

(Continued)

*Primary Examiner* — Miranda M Huang
*Assistant Examiner* — Bart I Rylander
(74) *Attorney, Agent, or Firm* — Polsinelli

(57) ABSTRACT

A computing device may be configured to intelligently activate gating within a current layer of a neural network that includes two or more filters. The computing device may receive a layer-specific input data that is specific to the current layer of the neural network, generate statistics based on the received layer-specific input data; and use the generated statistics to assign a relevance score to each of the two or more filters. Each assigned relevance score may indicate the relevance of the corresponding filter to the received layer-specific input data. The computing device may determine an activation status of each of the two or more filters in the current layer based on the identified relevance and apply the received layer-specific input data to the activated filters in the two or more filters to generate an output activation for the current layer of the neural network.

18 Claims, 11 Drawing Sheets

(56) References Cited

OTHER PUBLICATIONS

Dinh, L., Gumbel-Max Trick Inference, [retrieved Feb. 1, 2023]. Retrieved from Internet:<https://laurent-dinh.github.io/2016/11/22/gumbel-max> (Year: 2016).*
Figurnov, et al, Implicit Reparameterization Gradients, [received Apr. 18, 2025]. Retrieved from Internet:<https://proceedings.neurips.cc/paper_files/paper/2018/hash/92c8c96e4c37100777c7190b76d28233-Abstract.html> (Year: 2018).*
Louizos, C., et al, Learning Sparse Neural Networks Through L0 Regularization, [received Apr. 18, 2025]. Retrieved from Internet:<https://arxiv.org/abs/1712.01312> (Year: 2017).*
Shazeer, N., et al, Outrageously Large Neural Networks: The Sparsely-Gated Mixture-of-Experts Layer, [received Apr. 18, 2025]. Retrieved from Internet:<https://arxiv.org/abs/1701.06538> (Year: 2017).*
Zhang, S., et al, From CDF to PDF A Density Estimation Method for High Dimensional Data, [received Apr. 18, 2025]. Retrieved from Internet:<https://arxiv.org/abs/1804.05316> (Year: 2018).*
Csurka, G., Domain Adaptation for Visual Applications: A Comprehensive Survey, [received Aug. 21, 2025]. Retrieved from Internet:<https://arxiv.org/abs/1702.05374> (Year: 2017).*
Alippi, C., et al, Moving Convolutional Neural Networks to Embedded Systems: the AlexNet and VGG-16 case, [received Dec. 27, 2025]. Retrieved from Internet:<https://ieeexplore.ieee.org/abstract/document/8480072> (Year: 2018).*
Chen Z., et al., "You Look Twice: GaterNet for Dynamic Filter Selection in CNNs," arXiv: 1811.11205v2 [cs.CV], Apr. 1, 2019, 10 Pages, 2019, [retrieved Oct. 13, 2021], Retrieved from Internet: https://bengio.abracadoudou.com/cv/publications/pdf/chen_2018_arxiv.pdf, (Year: 2018).
Veit A., et al., "Convolutional Networks with Adaptive Inference Graphs", Oct. 6, 2018 Advances in Biometrics: International Conference, ICB 2007, Seoul, Korea, Aug. 27-29, 2007, Proceedings, Springer, Berlin, Heidelberg, pp. 3-18, XP047488279, pp. 1-16.
Min C., et al., "2PFPCE: Two-Phase Filter Pruning Based on Conditional Entropy," [online] [retrieved Oct. 13, 2021], Retrieved from internet: https://arxiv.org/pdf/1809.02220.pdf , Sep. 6, 2018, 8 pages.
Mullapudi R.T., et al., "HydraNets: Specialized Dynamic Architectures for Efficient Inference", Proceedings of the IEEE Conference on Computer Vision and Pattern Recognition, 2018, 10 pages, [online] [retrieved Oct. 13, 2021].
Shazeer N., et al., "Outrageously Large Neural Networks: The Sparsely-Gated Mixture-of-Experts Layer," [online] [retrieved Oct. 13, 2021], Retrieved from Internet: https://arxiv.org/pdf/1701.06538.pdf , 2017, 19 pages.
Dinh L., "Gumbel-Max Trick Inference", Thesis by Blogpost, Nov. 22, 2016, pp. 1-5.

* cited by examiner

CHANNEL GATING FOR CONDITIONAL COMPUTATION

RELATED APPLICATIONS

This application is a continuation of U.S. patent application Ser. No. 16/419,509, entitled "Channel Gating for Conditional Computation" filed May 22, 2019, the entire contents of which is hereby incorporated by reference for all purposes.

BACKGROUND

Deep neural networks are used heavily on computing devices for a variety of tasks, including scene detection, facial recognition, image sorting and labeling. These networks use a multilayered architecture in which each layer receives input, performs a computation on the input, and generates output or "activation." The output or activation of a first layer of nodes becomes an input to a second layer of nodes, the activation of a second layer of nodes becomes an input to a third layer of nodes, and so on. As such, computations in a deep neural network are distributed over a population of processing nodes that make up a computational chain.

Generally, neural networks that have longer computational chains (or larger learning capacity) generate more accurate results. However, their longer computational chains may also increase processing times and the amount of a computing device's processing and energy resources that is used by the neural network when processing tasks on the computing device.

Convolutional neural networks are deep neural networks in which computation in a layer is structured as a convolution. The weighted sum for each output activation is computed based on a batch of inputs, and the same matrices of weights (called "filters") are applied to every output. These networks implement a fixed feedforward structure in which all the processing nodes that make up a computational chain are used to process every task, regardless of the inputs. Conventionally, every filter in each layer is used to process every task, regardless of the input or computational complexity of the task. This is an inefficient use of resources that may increase processing times without any significant improvement in the accuracy or performance of the neural network.

SUMMARY

The various aspects of the disclosure provide a generalized framework for accomplishing conditional computation or gating in a neural network. Various aspects include methods for accomplishing conditional computation or gating in a neural network, which may include receiving, by a processor in a computing device, input in a layer in the neural network, the layer including two or more filters, determining whether the two or more filters are relevant to the received input, deactivating filters that are determined not to be relevant to the received input or activating filters that are determined to be relevant to the received input, and applying the received input to active filters in the layer to generate an activation. In some aspects, each of the two or more filters in the layer may be associated with a respective one of two or more gating functionality components.

Some aspects may further include enforcing conditionality on the gating functionality component by back propagating a loss function to approximate a discrete decision of at least one of the gating functionality components with a continuous representation. In some aspects, back propagating the loss function may include performing Batch-wise conditional regularization operations to match batch-wise statistics of one or more of the gating functionality components to a prior distribution.

In some aspects, determining whether the two or more filters are relevant to the received input may include global average pooling the received input to generate a global average pooling result, and applying the global average pooling result to each filter's associated gating functionality component to generate a binary value for each filter. In some aspects, deactivating filters that are determined not to be relevant to the received input or activating filters that are determined to be relevant to the received input may include identifying filters that may be ignored without impacting accuracy of the activation.

In some aspects, receiving the input in the layer of the neural network may receiving the input in a convolution layer of a residual neural network (ResNet), and deactivating filters that are determined not to be relevant to the received input or activating filters that are determined to be relevant to the received input may include identifying filters associated with the convolution layer of the ResNet that may be ignored without impacting accuracy of the activation. In some aspects, receiving the input in the layer of the neural network may include receiving a set of three-dimensional input feature maps that form a channel of input feature maps in a layer that includes two or more three-dimensional filters. In some aspects, applying the received input to active filters in the layer to generate an activation may include convolving the channel of input feature maps with one or more of the two or more three-dimensional filters to generate results, and summing the generated results to generate the activation of the convolution layer as a channel of output feature maps.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
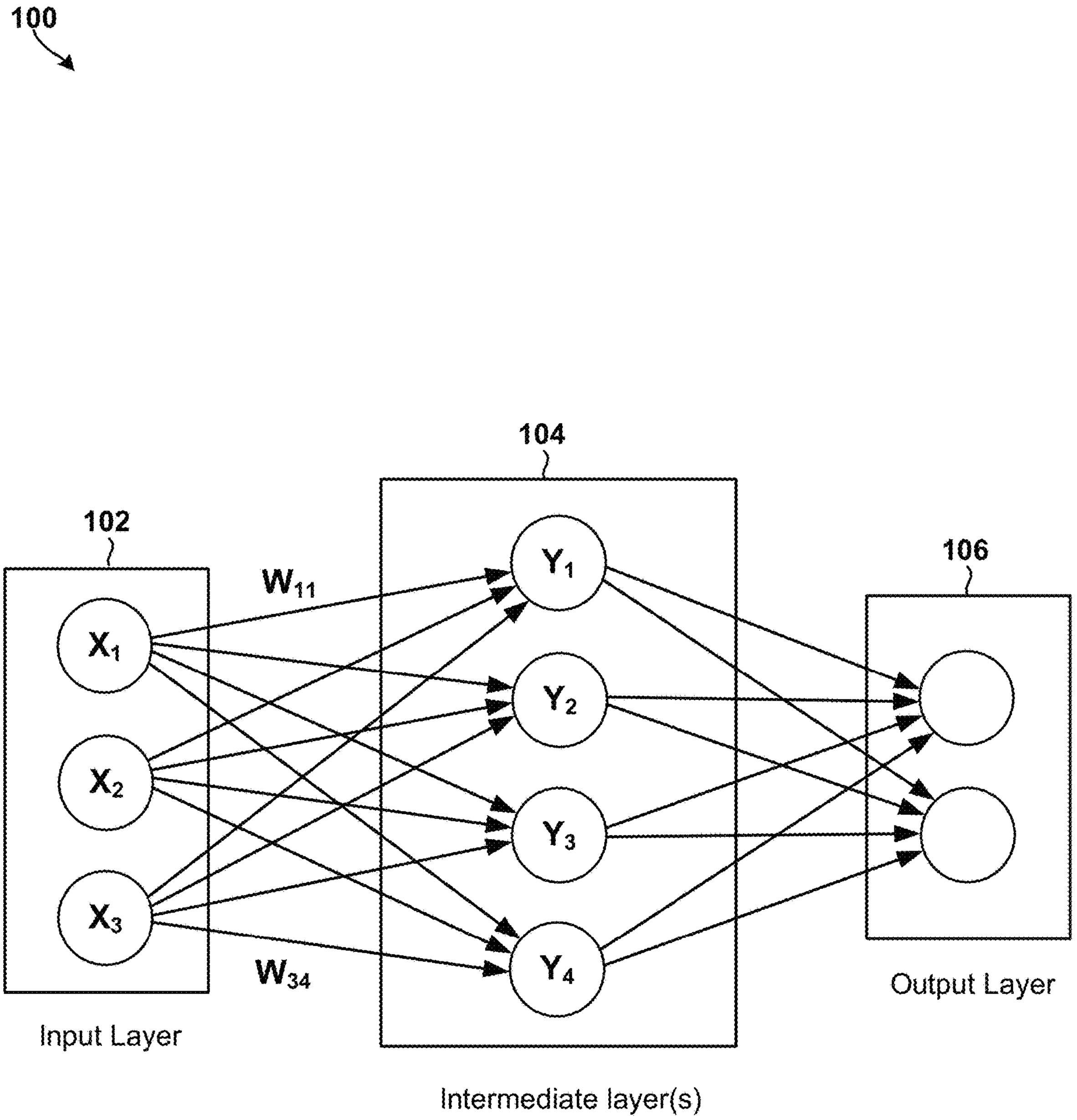
FIGS. 1A and 1B are functionality component block diagrams illustrating an example software implemented neural network that could benefit from implementing the embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices configured to implement the methods, for accomplishing conditional computation or gating in a neural network. A computing device configured in accordance with various embodiments may receive input in a neural network layer that includes two or more filters. Each filter may be associated with a respective one of two or more gating functionality components that intelligently determines whether the filter should be activated or deactivated. The computing device may identify or determine the filters that are relevant to the received input, and use the gating functionality component to activate or deactivate the filters based on their relevance to the received input. The computing device may apply the received input to the active filters in the layer to generate the output activations (e.g., an output feature map, etc.) for that layer. In addition, in some embodiments, the computing device may be configured to enforce conditionality on the gating functionality component to prevent mode collapse, which is a condition in which a gate remains in the on or off state permanently, or for an extended period of time, regardless of changes to the input. The computing device may enforce conditionality on the gating functionality component, and thus prevent mode collapse, by back propagating a loss function that ensures the gating functionality component does not cause the filters to remain in an active or deactivated state.

By intelligently identifying the filters that are relevant to the received input, and only applying relevant filters to the input, various embodiments allow the neural network to bypass inefficient or ineffective processing nodes in a computational chain. This may reduce processing times and resource consumption in the computing device executing the neural network, without negatively impacting the accuracy of the output generated by the neural network. Further, since only relevant filters are applied to the input, the neural network may include a larger number of filters or processing nodes, generate more accurate results, and process more complex tasks, without the additional nodes/filters negatively impacting operations performed for less complex tasks.

In addition, by back propagating the loss function in accordance with the embodiments, neural networks may perform uniform distribution matching, forgo performing batch normalization operations without any loss in the performance or accuracy of the output generated by the neural network, and inherently learn to output a particular distribution after the dot product. Back propagating the loss function in accordance with the embodiments may not only improve conditional gating (e.g., by preventing mode collapse, etc.), but also improve the quantization operations and improve overall computation performance of the neural network.

For all of the above reasons, and reasons that will be evident from the disclosures below, the various embodiments may improve the performance and functioning of a neural network and the computing devices on which it is implemented or deployed.

The term "computing device" is used herein to refer to any one or all of servers, personal computers, mobile device, cellular telephones, smartphones, portable computing devices, personal or mobile multi-media players, personal data assistants (PDA's), laptop computers, tablet computers, smartbooks, IoT devices, palm-top computers, wireless electronic mail receivers, multimedia Internet enabled cellular telephones, connected vehicles, wireless gaming controllers, and similar electronic devices that include a memory and a programmable processor.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and activation. The weight values may be determined during a training phase and iteratively updated as data flows through the neural network.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black-box layers.

Each layer in a neural network may have multiple inputs, and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer as well as multiple preceding layers.

The term "batch normalization" is used herein to refer to a process for normalizing the inputs of the layers in a neural network to reduce or eliminate challenges associated with internal covariate shift, etc. Conventional neural networks perform many complex and resource-intensive batch normalization operations to improve the accuracy of their outputs. By back propagating the loss function in accordance with some embodiments, a neural network may forgo performing batch normalization operations without reducing accuracy of its outputs, thereby improving the performance and efficiency of the neural network and the computing devices on which it is deployed.

The term "quantization" is used herein to refer to techniques for mapping input values of a first level of precision (e.g., first number of bits) to output values in a second, lower level of precision (e.g., smaller number of bits). Quantization is frequently used to improve the performance and efficiency of a neural network and the computing devices on which it is deployed.

Various embodiments provide efficient algorithms that may be implemented in circuitry, in software, and in combinations of circuitry and software without requiring a complete understanding or rigorous mathematical models. The embodiment algorithms may be premised upon a general mathematical model of the linear and nonlinear interferences, some of the details of which are described below. These equations are not necessarily directly solvable, and provide a model for structuring that perform operations for improved neural network performance according to various embodiments.

Figure 1B:
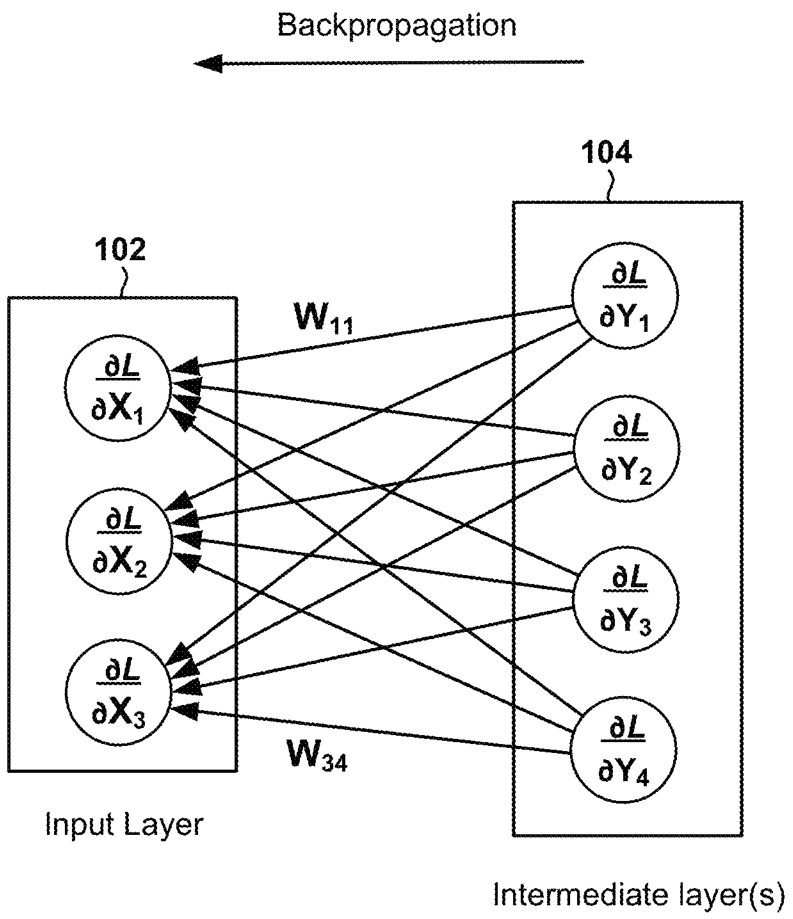

FIGS. 1A and 1B illustrate an example neural network 100 that could be implemented in a computing device, and which could benefit from implementing the embodiments. With reference to FIG. 1A, the neural network 100 may include an input layer 102, intermediate layer(s) 104, and an output layer 106. Each of the layers 102, 104, 106 may include one or more processing nodes that receive input values, perform computations based the input values, and propagate the result (activation) to the next layer.

In feed-forward neural networks, such as the neural network 100 illustrated in FIG. 1A, all of the computations are performed as a sequence of operations on the outputs of a previous layer. The final set of operations generate the output of the neural network, such as a probability that an image contains a specific item (e.g., dog, cat, etc.) or information indicating that a proposed action should be taken. Many neural networks 100 are stateless. The output for an input is always the same irrespective of the sequence of inputs previously processed by the neural network 100.

The neural network 100 illustrated in FIG. 1A includes fully-connected (FC) layers, which are also sometimes referred to as multi-layer perceptrons (MLPs). In a fully-connected layer, all outputs are connected to all inputs. Each processing node's activation is computed as a weighted sum of all the inputs received from the previous layer.

An example computation performed by the processing nodes and/or neural network 100 may be: $y_j=f(\Sigma^3_{i=1} W_{ij}*x_i+b)$, in which $W_{ij}$ are weights, $x_i$ is the input to the layer, $y_j$ is the output activation of the layer, f(•) is a non-linear function, and b is bias. As another example, the neural network 100 may be configured to receive pixels of an image (i.e., input values) in the first layer, and generate outputs indicating the presence of different low-level features (e.g., lines, edges, etc.) in the image. At a subsequent layer, these features may be combined to indicate the likely presence of higher-level features. For example, in training of a neural network for image recognition, lines may be combined into shapes, shapes may be combined into sets of shapes, etc., and at the output layer, the neural network 100 may generate a probability value that indicates whether a particular object is present in the image.

The neural network 100 may learn to perform new tasks over time. However, the overall structure of the neural network 100, and operations of the processing nodes, do not change as the neural network learns the task. Rather, learning is accomplished during a training process in which the values of the weights and bias of each layer are determined. After the training process is complete, the neural network 100 may begin "inference" to process a new task with the determined weights and bias.

Training the neural network 100 may include causing the neural network 100 to process a task for which an expected/desired output is known, and comparing the output generated by the neural network 100 to the expected/desired output. The difference between the expected/desired output and the output generated by the neural network 100 is referred to as loss (L).

During training, the weights ($w_{ij}$) may be updated using a hill-climbing optimization process called "gradient descent." This gradient indicates how the weights should change in order to reduce loss (L). A multiple of the gradient of the loss relative to each weight, which may be the partial derivative of the loss $$\left(e.g., \frac{\partial L}{\partial X1}, \frac{\partial L}{\partial X2}, \frac{\partial L}{\partial X3}\right)$$

with respect to the weight, could be used to update the weights.

An efficient way to compute the partial derivatives of the gradient is through a process called backpropagation, an example of which is illustrated in FIG. 1B. Backpropagation may operate by passing values backwards through the network to compute how the loss is affected by each weight. The backpropagation computations may be similar to the computations used when traversing the neural network 100 in the forward direction (i.e., during inference). To improve performance, the loss (L) from multiple sets of input data ("a batch") may be collected and used in a single pass of updating the weights. Many passes may be required to train the neural network 100 with weights suitable for use during inference (e.g., at runtime or during execution of a software application program).

Figure 2:
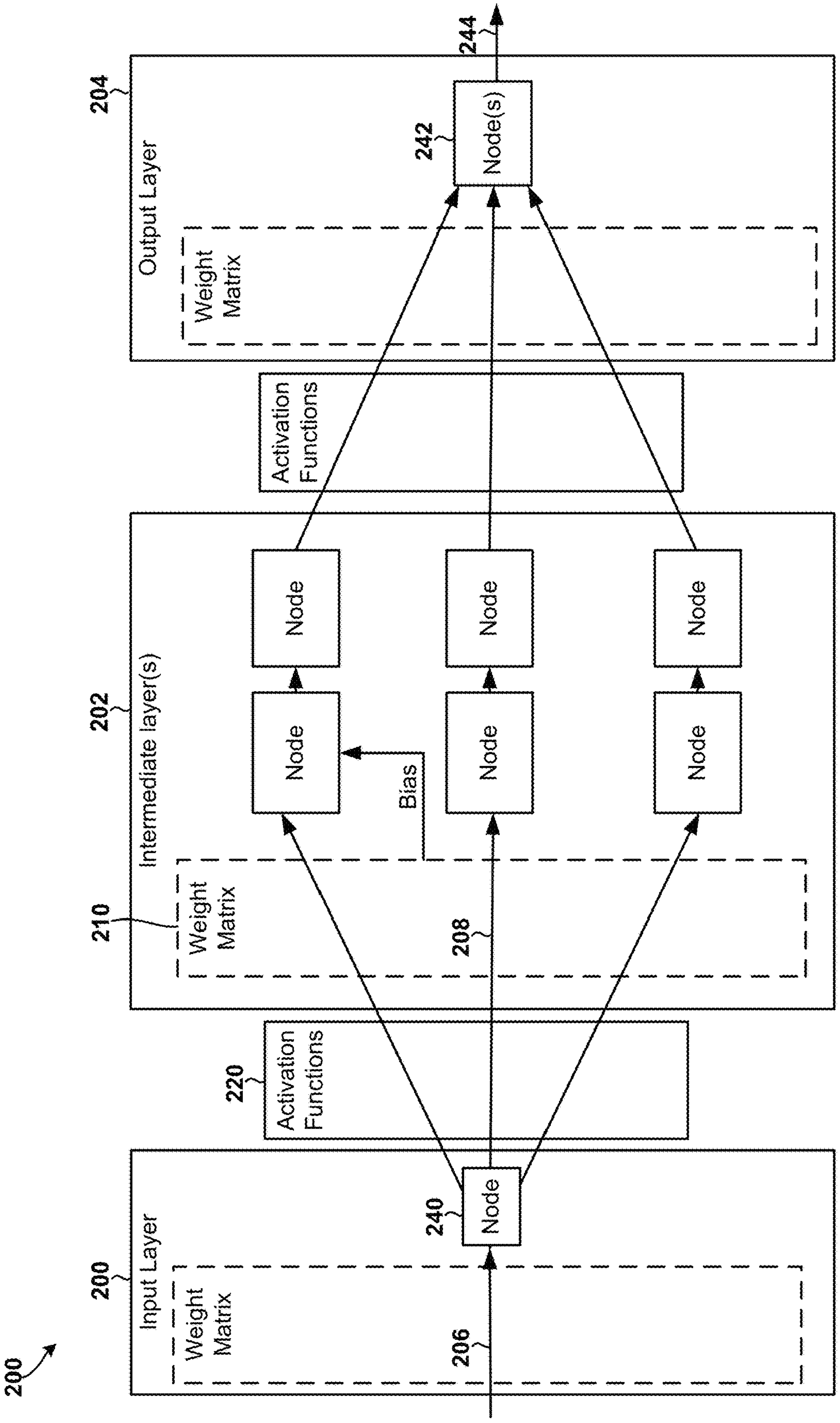
FIG. 2 is a functionality component block diagram illustrating interactions between functionality components in an example perceptron neural network that could benefit from implementing the embodiments.

FIG. 2 illustrates interactions between functionality components in another example neural network 200 that could be implemented in a computing device, and which could benefit from the implementation or use of the various embodiments. In the example illustrated in FIG. 2, the neural network 200 is a multilayer perceptron neural network that includes an input layer 200, one or more intermediate layer 202, and an output layer 204. Each of the layers may include one or more nodes 240 that perform operations on the data. In between the layers, there may be various activation functions 220, such as a rectified linear unit (ReLU) that cuts off activations below zero. For ease of reference, and to focus the description on the important features, a layer and its activation functions 220 are sometimes referred to herein collectively as a "layer."

The input layer 200 may receive and process an input signal 206, generate an activation 208, and pass it to the intermediate layer(s) 202 as black-box inputs. The intermediate layer(s) inputs may multiply the incoming activation with a weight matrix 210 or may apply one or more weight factors and/or a bias to the black-box inputs.

The nodes in the intermediate layer(s) 202 may execute various functions on the inputs augmented with the weight factors and the bias. Intermediate signals may be passed to other nodes or layers within the intermediate layer(s) 202 to produce the intermediate layer(s) activations that are ultimately passed as inputs to the output layer 204. The output layer 204 may include a weighting matrix that further augments each of the received signals with one or more weight factors and bias. The output layer 204 may include a node 242 that operates on the inputs augmented with the weight factors to produce an estimated value 244 as output or neural network inference.

The neural networks 100, 200 described above include fully-connected layers in which all outputs are connected to all inputs, and each processing node's activation is a weighted sum of all the inputs received from the previous layer. In larger neural networks, this may require that the network perform complex computations. The complexity of these computations may be reduced by reducing the number of weights that contribute to the output activation, which may be accomplished by setting the values of select weights to zero. The complexity of these computations may also be reduced by using the same set of weights in the calculation of every output of every processing node in a layer. The repeated use of the same weight values is called "weight sharing." Systems that implement weight sharing store fewer weight parameters, which reduces the storage and processing requirements of the neural network and the computing device on which it is implemented.

Some neural networks may be configured to generate output activations based on convolution. By using convolution, the neural network layer may compute a weighted sum for each output activation using only a small "neighborhood" of inputs (e.g., by setting all other weights beyond the neighborhood to zero, etc.), and share the same set of weights (or filter) for every output. A set of weights is called a filter. A filter may also be a two- or three-dimensional matrix of weight parameters. In various embodiments, a computing device may implement a filter via a multidimensional array, map, table or any other information structure known in the art.

Generally, a convolutional neural network is a neural network that includes multiple convolution-based layers. The use of convolution in multiple layers allows the neural network to employ a very deep hierarchy of layers. As a result, convolutional neural networks often achieve significantly better performance than neural networks that do not employ convolution.

Figure 3A:
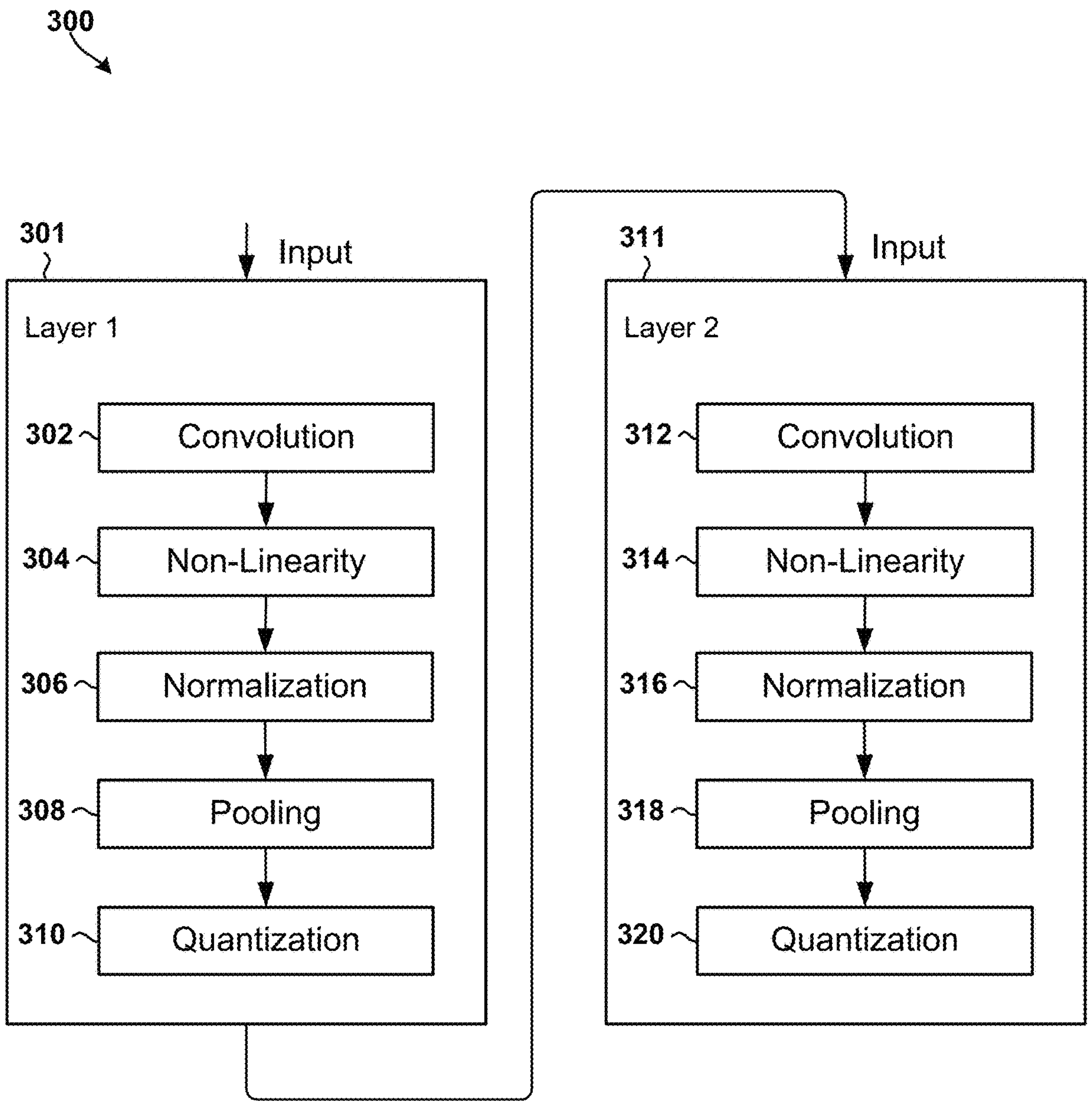
FIGS. 3A and 3B are functionality component block diagrams illustrating interactions between functionality components in an example convolutional neural network that could be configured to implement a generalized framework to accomplish conditional computation or gating in accordance with the embodiments.
Figure 3B:
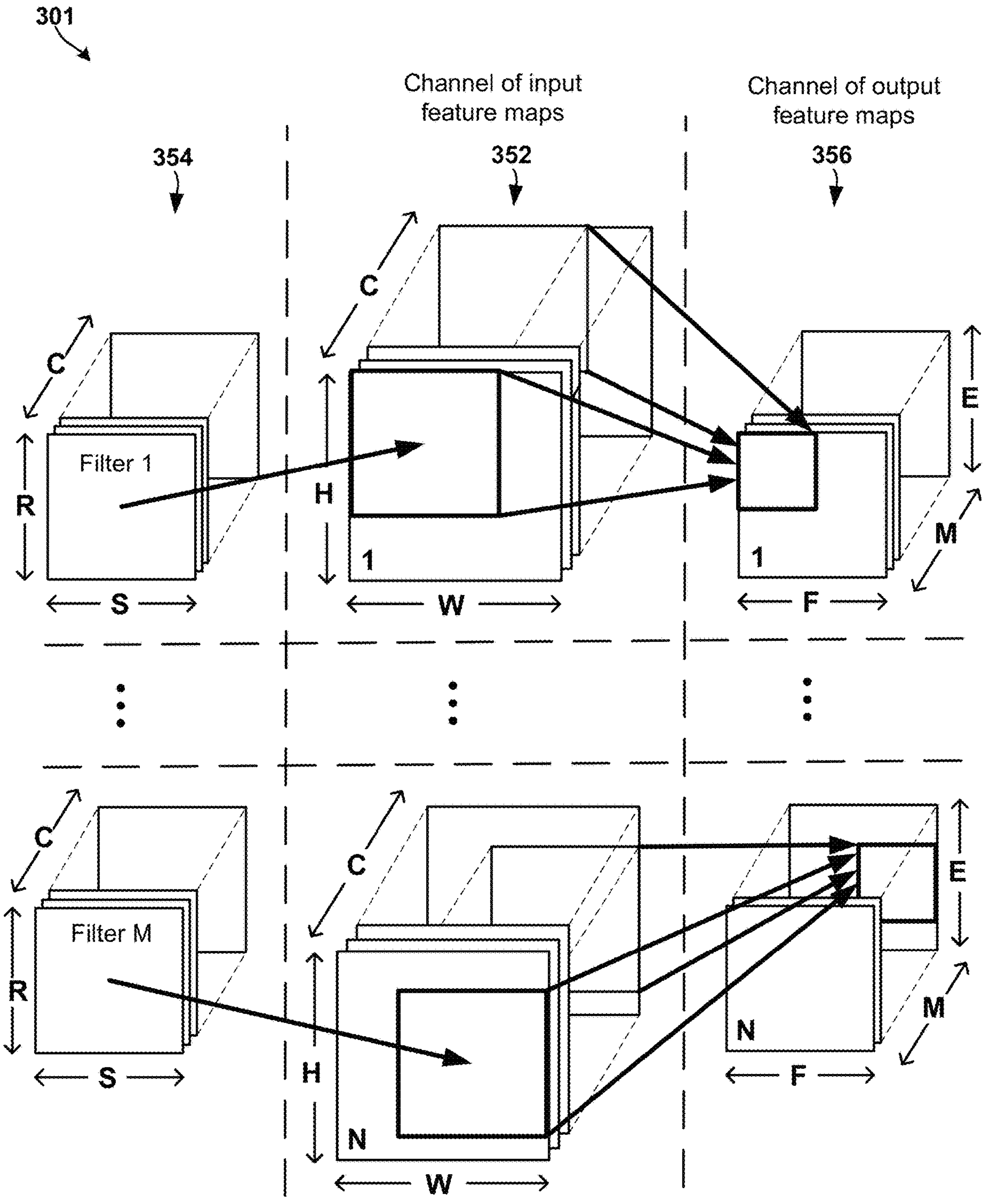

FIGS. 3A and 3B illustrate example functionality components that may be included in a convolutional neural network 300, which could be implemented in a computing device and configured to implement a generalized framework to accomplish conditional computation or gating functionality component in accordance with various embodiments.

With reference to FIG. 3A, the convolutional neural network 300 may include a first layer 301 and a second layer 311. Each layer 301, 311 may include one or more activation functions. In the example illustrated in FIG. 3A, each layer 301, 311 includes convolution functionality component 302, 312, a non-linearity functionality component 304, 314, a normalization functionality component 306, 316, a pooling functionality component 308, 318, and a quantization functionality component 310, 320. It should be understood that, in various embodiments, the functionality components 302-310 or 312-320 may be implemented as part of a neural network layer, or outside the neural network layer.

The convolution functionality component 302, 312 may be an activation function for its respective layer 301, 311. The convolution functionality component 302, 312 may be configured to generate a matrix of output activations called a feature map. The feature maps generated in each successive layer 301, 311 typically include values that represent successively higher-level abstractions of input data (e.g., line, shape, object, etc.).

The non-linearity functionality component 304, 314 may be configured to introduce nonlinearity into the output activation of its layer 301, 311. In various embodiments, this may be accomplished via a sigmoid function, a hyperbolic tangent function, a rectified linear unit (ReLU), a leaky ReLU, a parametric ReLU, an exponential LU function, a maxout function, etc.

The normalization functionality component 306, 316 may be configured to control the input distribution across layers to speed up training and the improve accuracy of the outputs or activations. For example, the distribution of the inputs may be normalized to have a zero mean and a unit standard deviation. The normalization function may also use batch normalization (BN) techniques to further scale and shift the values for improved performance. However, as is described in more detail below, by backpropagating the loss function during training in accordance with the various embodiments, the neural network may forgo performing batch normalization operations without any loss in accuracy of the neural network models.

The pooling functionality components 308, 318 may be configured to reduce the dimensionality of a feature map generated by the convolution functionality component 302, 312 and/or otherwise allow the convolutional neural network 300 to resist small shifts and distortions in values.

The quantization functionality components 310, 320 may be configured to map one set of values having a first level of precision (e.g., first number of bits) to a second set of value having a second level of precision (e.g., a different number of bits). Quantization operations generally improve the performance of the neural network. As is described in more detail below, backpropagating the loss function during training in accordance with the various embodiments may improve the quantization operations and/or the neural network may forgo performing quantization operations without any loss in accuracy or performance of the neural network.

With reference to FIG. 3B, in some embodiments, the inputs to the first layer 301 may be structured as a set of three-dimensional input feature maps 352 that form a channel of input feature maps. In the example illustrated in FIG. 3B, the neural network has a batch size of N three-dimensional feature maps 352 with height H and width W each having C number of channels of input feature maps (illustrated as two-dimensional maps in C channels), and M three-dimensional filters 354 including C filters for each channel (also illustrated as two-dimensional filters for C channels). Applying the 1 to M filters 354 to the 1 to N three-dimensional feature maps 352 results in N output feature maps 356 that include M channels of width F and height E. As illustrated, each channel may be convolved with a three-dimensional filter 354. The results of these convolutions may be summed across all the channels to generate the output activations of the first layer 301 in the form of a channel of output feature maps 356. Additional three-dimensional filters may be applied to the input feature maps 352 to create additional output channels, and multiple input feature maps 352 may be processed together as a batch to improve weight sharing or the reuse of the filter weights. The results of the output channel (e.g., set of output feature maps 356) may be fed to the second layer 311 in the convolutional neural network 300 for further processing.

Figure 4:
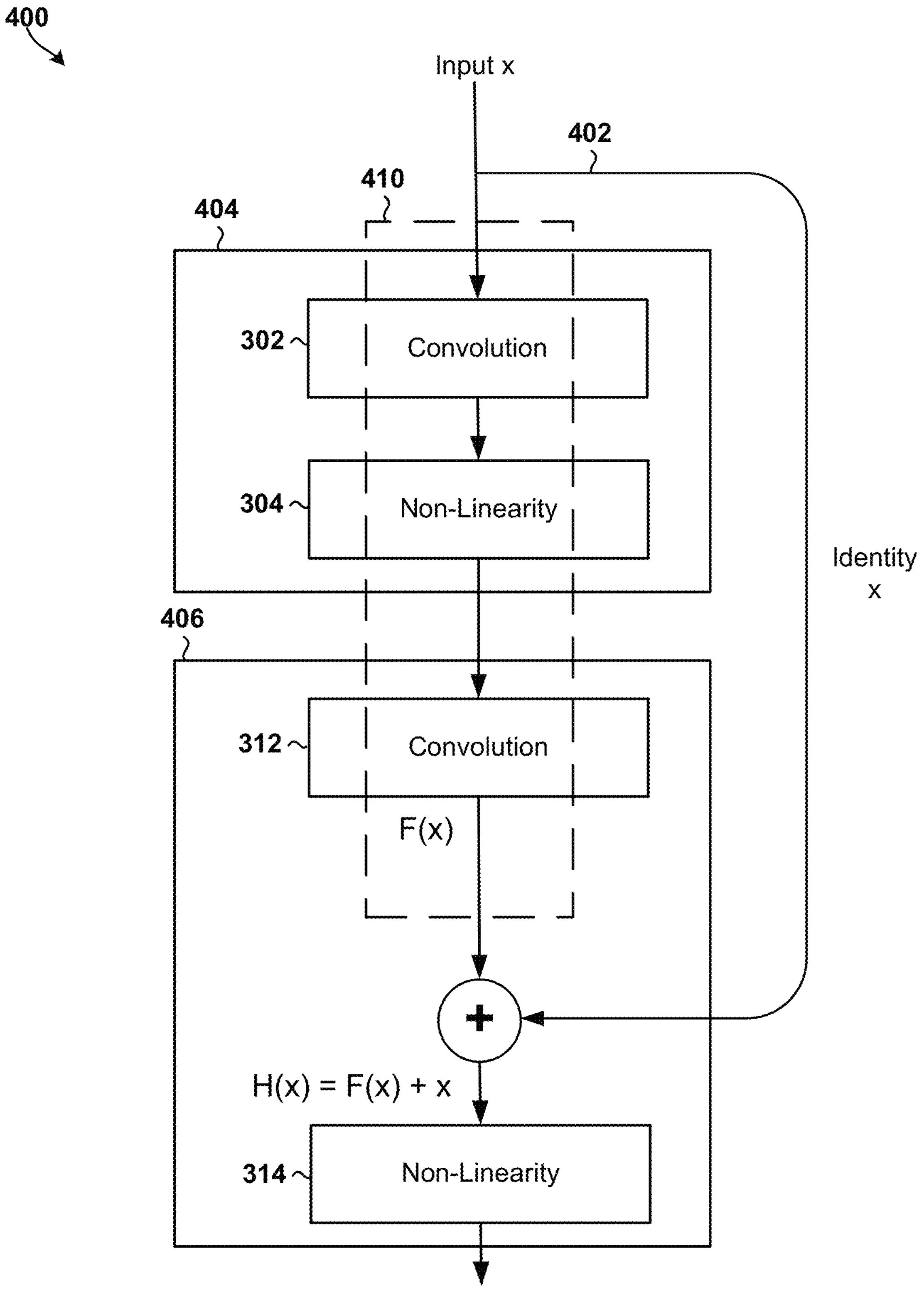
FIG. 4 is a functionality component block diagram illustrating interactions between functionality components in an example residual neural network (ResNet) that could be configured to implement a generalized framework to accomplish conditional computation or gating in accordance with the embodiments.

FIG. 4 illustrates example operations in a residual neural network (ResNet) 400 that could be implemented in a computing device, and which could benefit from implementing the various embodiments. A ResNet 400 may be a very deep convolutional network that uses residual connections (e.g., identity connection 402, etc.) to support including additional layers in the neural network. That is, one of the challenges with deep neural networks is the vanishing gradient problem encountered during training. The gradient shrinks as the error backpropagates through the network, which may affect the network's ability to update the weights in the earlier layers in very deep networks. A ResNet 400 overcomes this challenge by using a 'shortcut' module, which includes an identity connection 402 (also sometimes call a "skip connection") that allows one or more convolution layers (also sometimes called "weight layers") to be skipped. Rather than learning the function F(x) for the convolution layers 404, 406, the shortcut module learns the residual mapping (H(x)=F(x)+x). Initially, the path through the identity connection 402 is taken. Gradually during training, ResNet 400 begins using the actual forward path 410 through the convolution layers 404, 406.

Figure 5:
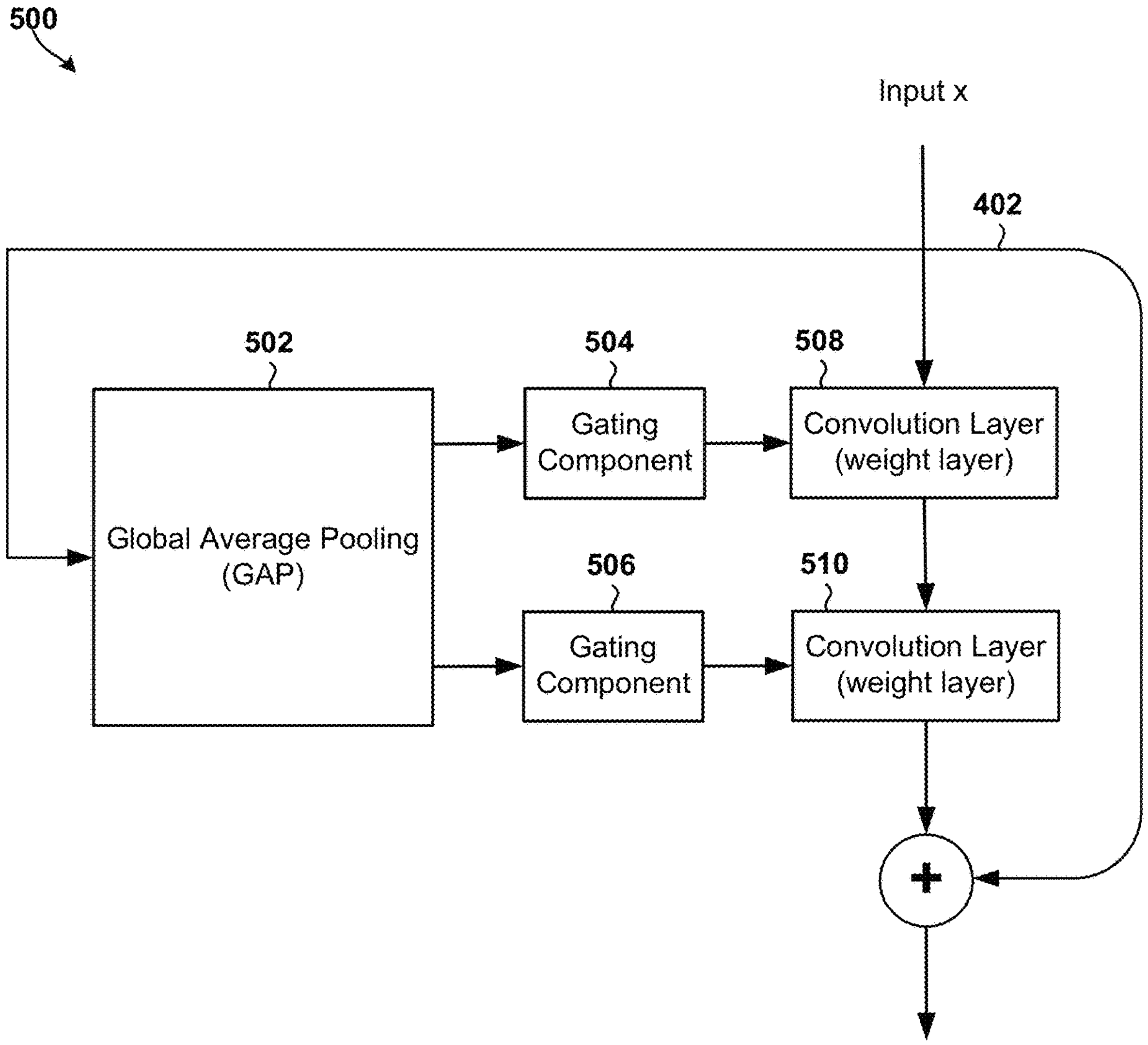
FIG. 5 is a functionality block diagram illustrating a ResNet block that may be used to accomplish gating or conditional computation in a ResNet in accordance with some embodiments.

FIG. 5 is an illustration of ResNet block 500 that may be used accomplish gating or conditional computation in a neural network in accordance with the embodiments. In the example illustrated in FIG. 5, the ResNet block 500 includes a global average pooling (GAP) functionality component 502, two gating functionality components 504, 506, two convolution layers 508, 510, and an identity connection 402 that allows the convolution layers 508, 510 to be skipped. The convolution layers 508, 510 may include filters (e.g., filter 354 illustrated in FIG. 3, etc.) that are applied to input feature maps to generate output feature maps.

As mentioned above, convolution layers are sometimes called weight layers. Weight layers should not be confused with weight parameters, which are values determined during training and included in filters that are applied to the input data to generate an output activation.

The ResNet block 500 may be configured to receive and use the input to a layer to determine the filters in the convolution layers 508, 510 that are relevant to the input. For example, the ResNet block 500 may send the input to the GAP functionality component 502. The GAP functionality component 502 may generate statistics for the input, such as an average over the spatial dimensions of the input feature map or a global average pooling result. The GAP functionality component 502 may send the global average pooling result to the gating functionality component 504, 506.

The gating functionality component 504, 506 may employ a lightweight design that does not consume processing or memory resources of the neural network or the computing device on which it is implemented. The gating functionality component 504, 506 may be configured to receive the global average pooling result from the GAP functionality component 502, and generate a binary value or a matrix of binary values for each of the convolution layer 508, 510 based on the global average pooling result. The gating functionality component 504, 506 may send the computed values to their respective convolution layers 508, 510.

The convolution layers 508, 510 may receive and use the binary values to determine whether to activate or deactivate one or more of its filters. The convolution layers 508, 510 may generate an output activation by applying the received input (x) to the active filters in the layer. Thus, the embodiments allow for deactivating a filter that would otherwise be automatically applied to an input feature map as part of the convolution operations described with reference to FIG. 3B.

Deactivating a filter in a convolution layer 508, 510 may effectively remove a processing node from the computational chain of the neural network. As such, unlike the ResNet 400 illustrated in FIG. 4, a neural network that includes the ResNet block 500 does not execute all layers during training or during inference (e.g., at runtime or during execution of a software application program). Rather, the ResNet block 500 allows the neural network to determine, for each input, which subset of layers to execute based on their relevance to the input. In some embodiments, the ResNet block 500 may allow the neural network to determine, within each layer and for each input, the subset of filters that should be applied to the input based on their relevance to the input. This improves the conditional computation capabilities of the neural network, and improves the performance and functioning of the computing device that implements the neural network.

Figure 6A:
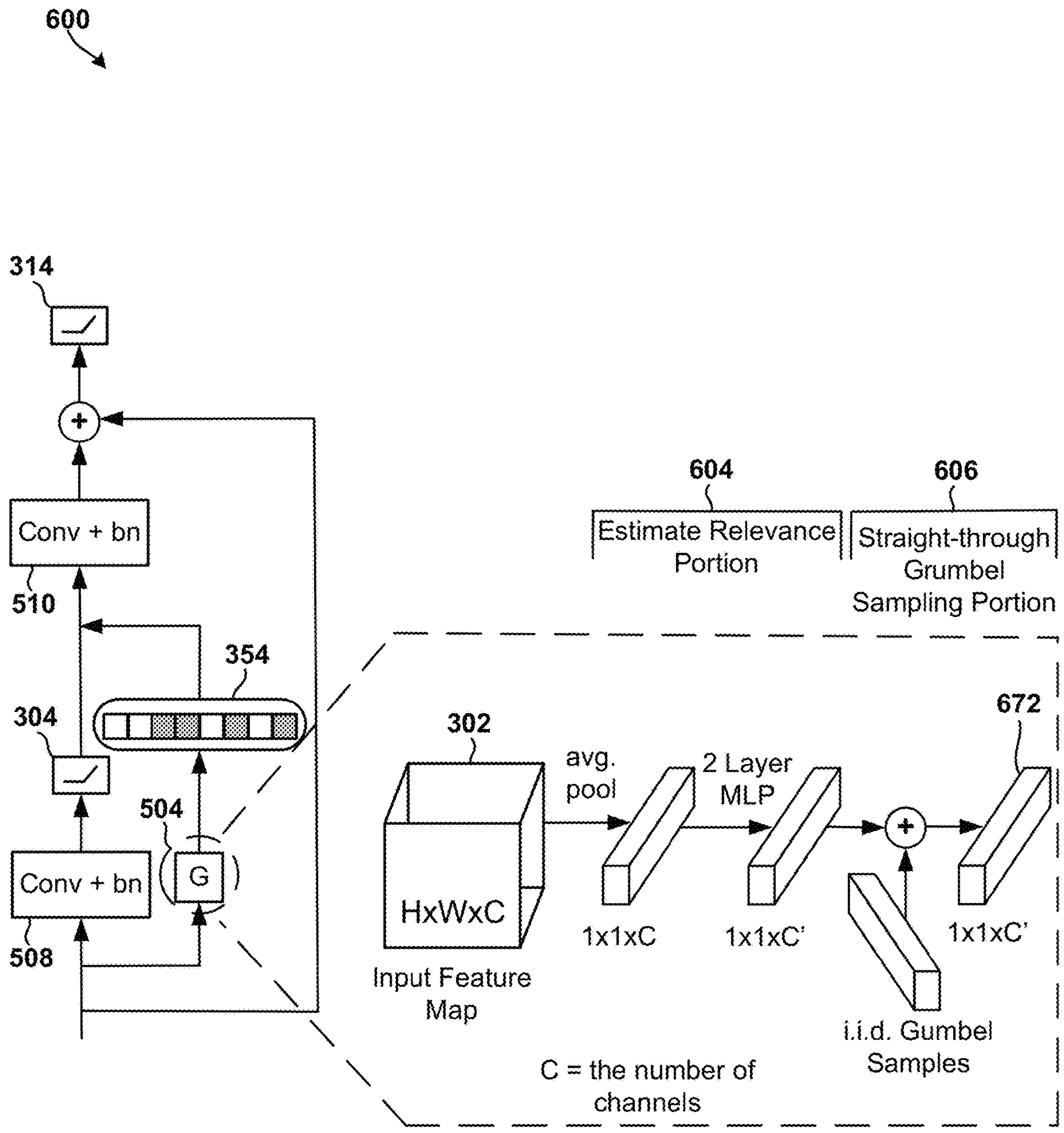
FIGS. 6A and 6B are block diagrams illustrating functionality components and interactions in a system that implements a generalized framework for a gating functionality component for accomplishing conditional computation in a neural network in accordance with some embodiments.
Figure 6B:
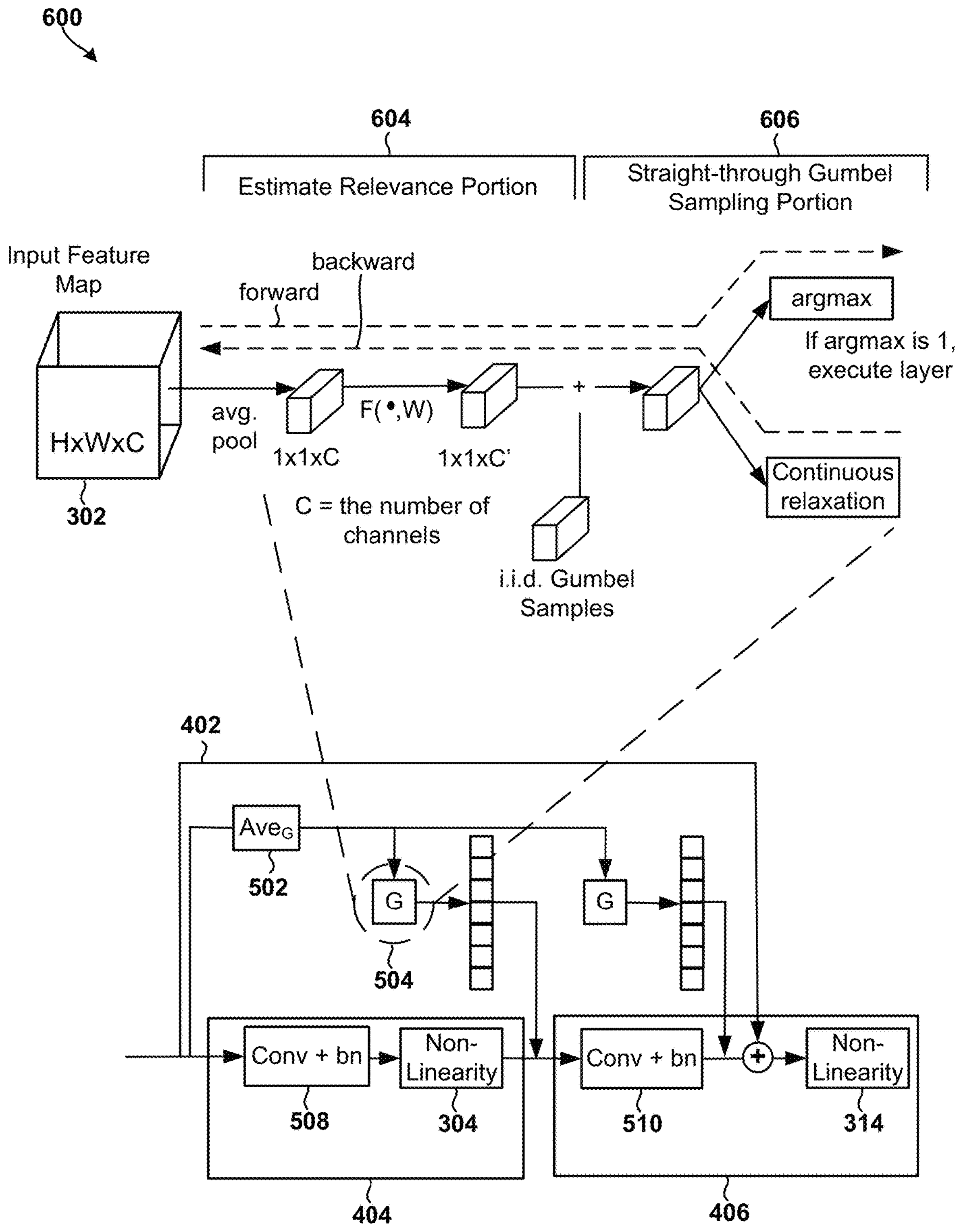

FIGS. 6A and 6B illustrate a system 600 that implements a generalized framework for a gating functionality component 504 that may be used to accomplish conditional computation in a neural network in accordance with the embodiments. The system 600 allows a neural network to identify or determine the filters 354 that are relevant to the received input, and selectively activating or deactivate one or more filters 354 based on their relevance to the received input. This may significantly reduce the complexity of the computations performed in each layer of the neural network without negatively impacting the accuracy of the output activations.

With reference to FIGS. 6A and 6B, each gating functionality component 504, 506 may include an estimate relevance portion 604 and a straight-through grumble sampling portion 606. The functionality components in the estimate relevance portion 604 estimate the relevance of a filter 354 in the convolution layer (or weight layer). The straight-through grumble sampling portion 606 may determine whether to activate or deactivate filters based on the estimate or value generated by the estimate relevance portion 604. The output 672 of the gating functionality component 504, 506 may be a vector of size 1*1*C, where C is the number of channels in the output of the first convolution layer 508 in the ResNet block.

The system 600 differs from commonly used convolutional layers because the gating functionality component may intelligently determine the convolutional channels, feature maps, or specific filters that may be ignored without impacting the accuracy of the output. In particular, the gating functionality component takes as input simple statistics of the input to a layer (or any of the layers before or after it, including the output function). These simple statistics are, for example, the average over the spatial dimensions of the input feature map. These statistics are fed as input to the gating functionality component, which gates the output or input of a convolutional layer. The gating functionality component makes a binary decision at the forward path, such as zero (0) for off and one (1) for on, to determine whether a feature should be computed or skipped.

During backpropagation through the backward path, the system 600 may approximate the discrete decision of the gating functionality component with a continuous representation. In particular, the Gumbel-Max trick and its continuous relaxation (e.g., by using a sigmoid to account for having one neuron per gate, etc.) may be used to approximate the discrete output of the gating functionality component with a continuous representation, and to allow for the propagation of gradients. This allows the gating functionality components to make discrete decisions and still provide gradients for the relevance estimation. These operations may allow the gating functionality component to learn how to fire conditionally based on the input (e.g., e.g. the actual input image/sound-file/video etc.), output activations of the layers, the output of the neural network, or any of the features computed in the neural network during execution. In some embodiments, these operations may effectively create a cascading classifier that is used by the gating functionality component to learn how to fire conditionally.

For ease of reference and to focus the discussion on the important features, the examples illustrated in FIGS. 6A and 6B and described below implement a ResNet structure. However, it should be understood that the system 600 may implement any neural network structure known in the art.

As mentioned above, mode collapse during training is common because the gating functionality component may collapse to either being completely on, or completely off. In some cases, gating functionality component may fire randomly on/off without learning to make a decision conditioned on the input. In an optimal setting however, the firing pattern of the gating functionality component is conditional depending on the input. To steer the behavior of the gating functionality component and neural network to exhibit this conditional pattern, the system 600 may be configured to back propagate the loss function:

$$\mathrm{Loss}CDF = \frac{1}{N}\sum_{i=0}^{N}\left(\frac{i}{N} - CDF(\mathrm{sort}(x_i))\right)^2$$

in which N is batch size of the feature maps.

Back propagating the above loss function may be referred herein as the Batch-wise conditional regularization operations. The Batch-wise conditional regularization operations may match the batch-wise statistics for each gating functionality component to a prior distribution, such as a prior beta-distribution probability density function (PDF). This ensures that for a batch of samples, the regularization term pushes the output to the on state for some samples, and to the off state for the other samples, while also pushing the decision between the on/off states to be more distinct.

The Batch-wise conditional regularization operations may not only improve conditional gating, but also enable the neural network to perform uniform distribution matching operations that are useful in many other applications. That is, the Batch-wise conditional regularization operations may be performed to match the batch-wise statistics of any function to any prior distribution. For example, the system 600 could be configured to perform the Batch-wise conditional regularization operations to choose a uniform distribution for the prior activation so that quantization of activations of a layer could be optimized. The system 600 could also match the activations to a bimodal Gaussian distribution so the layer learns better distinguishing features.

In addition, the Batch-wise conditional regularization operations may allow the network to learn the weights of the neural network in such a way that its output is shifted or expanded to follow a gaussian distribution. This allows the neural network to forgo performing batch normalization operations without any loss in the performance or accuracy in its output. Since the parameters batch normalization often do no match, eliminating the batch normalization operations may significantly improve the performance of the neural network.

Generally, a ResNet (e.g., ResNet 400 illustrated in FIG. 4) building block may be defined as:

$$x_{l+1} = \sigma(F(x_1) + x_1)$$

where $x_i \in R^{c^l \times x^l \times h^l}$, and $x_{i+1} \in R^{c^{l+1} \times x^{l+1} \times h^{l+1}}$ denote the input and output of the residual block, and σ is the activation function, in this case a ReLU function. The residual function $F(x_l)$ is the residual mapping to be learned and is defined as $F=W_2*\sigma(W_1*x)$. Here * denotes the convolution operator. $W_1 \in R^{c^l \times c_1^{l+1} \times k \times k}$ is a set of $c_1^{l+1}$ filters, with each filter of size k×k. Similarly, $W_2 \in R^{c_1^{l+1} \times c^{l+1} \times k \times k}$. After each convolution layer, batch normalization is adopted.

A gated ResNet building block implemented in accordance with the embodiments (e.g., ResNet block 500, system 600, etc.) may be defined as:

$$x_{l+1} = \sigma(W_2 * (G(x_1) \cdot \sigma(W_1 * x) + x_1)$$

where G is a gating unit (e.g., gating functionality component 504, 506, etc.) and $$G(x_1) = \left[g_1, g_2, g_3, \ldots\ g_{C_1^{l+1}}\right]$$

is the output of the gating unit/function, where $g_c \in \{0, 1\}$: 0 denotes skipping the convolution operation for filter c in $W_1$, and 1 denotes computing the convolution. Here the operator "·" refers to channel-wise multiplication between the output feature map $\sigma(W_1*x)$ and the vector G $(x_1)$. The sparser the output of G $(x_1)$, the more computation the system 600 may save.

To enable a light gating unit design (e.g., for gating functionality component 504, 506, etc.), some embodiments may squeeze global spatial information in $x_1$ into a channel descriptor as input to the gating functionality component. This may be achieved via channel-wise global average pooling. For the gating functionality component, the system 600 may use a simple feed-forward design that includes two fully connected layers, with only 16 neurons in the hidden layer ($W_{g1} \in R^{c^l \times 16}$) The system 600 may apply batch normalization and non-linearity (e.g., ReLU) on the output of the first fully connected layer. The second fully connected layer $$\left(W_{g1} \in R^{16 \times c_1^{l+1}}\right)$$

may linearly project the features to (unnormalized) log-probabilities $\pi_{i,k}$, $i \in \{1, 2\}$ and $$k = \{1, 2, C_1^{l+1}\}.$$

In this manner, the gating functionality components (e.g., gating functionality component 504, 506, etc.) may be computationally inexpensive, and have an additional overhead that is approximately X % of a ResNet block multiply-and-accumulate (MAC) usage.

To dynamically select a subset of filters (e.g., filters 354) relevant for the current input, the system 600 may map the output of the gating functionality component to a binary vector. The task of training towards binary valued gates is challenging because the system 600 may not be able to directly back-propagate through a non-smooth gate. As such, in some embodiments, the system 600 may be configured to leverage an approach called Gumbel Softmax sampling to circumvent this problem.

Let u~Uniform (0,1). A random variable G is distributed according to a Gumbel distribution G~Gumbel (G; μ,β), if G=μ−β ln(−ln(u)). The case where μ=0 and β=1 is called the standard Gumbel distribution. The Gumbel-Max trick allows drawing samples from a Categorical($\pi_1 \ldots \pi_i$) distribution by independently perturbing the log-probabilities $\pi_i$ with i.i.d. Gumbel(G; 0; 1) samples and then computing the argmax. That is:

$$\text{argmax}_i[\ln\pi_i + G_i] \sim \text{Categorical}(\pi_1 \ldots \pi_i)$$

System 600 may sample from a Bernoulli distribution Z~B(z; π), where $\pi_1$ and $\pi_2=1-\pi_1$ represent the two states for each of the gates (on or off) corresponding to the output of the gating functionality component. Letting z=1 means that:

$$\ln\pi_1 + G_1 > \ln(1-\pi_1) + G2.$$

Provided that the difference of two Gumbel-distributed random variables has a logistic distribution $G_1-G_2=\ln(u)-\ln(1-u)$, the argmax operation in equation yields:

$$z = \begin{cases} 1 & \ln(u) - \ln(1-u) + \ln\pi_1 - \ln(1-\pi_1) > 0 \\ 0 & \text{Otherwise} \end{cases}$$

The argmax operation is non-differentiable, and the system 600 may not be able to backpropagate through it. Instead, the system 600 may replace the argmax with a soft thresholding operation such as the sigmoid function with temperature:

$$\sigma_\tau(x) = \sigma\left(\frac{x}{\tau}\right).$$

The parameter τ controls the steepness of the function. For τ→0, the sigmoid function recovers the step function. For ease of reference, the system 600 may use $$\tau = \frac{2}{3}$$

for experiments.

The Gumbel-Max trick, therefore, allows the system 600 to back-propagate the gradients through the gating functionality components.

In order to facilitate learning of more conditional features, the system 600 may be configured to introduce a differentiable loss that encourages features to become more conditional based on batch-wise statistics. The procedure defined below may be used to match any batch-wise statistic to an intended probability function.

Consider a parameterized feature in a neural network X(θ), the intention is to have X(θ) distributed more like a chosen probability density function $f_X(x)$, defined on the finite range [0, 1] for simplicity. $F_X(x)$ is the corresponding cumulative distribution function (CDF). To do this the system 600 may consider batches of N samples $x_1$: N drawn from X(θ). These may be calculated during training from the normal training batches. The system 600 may then sort $x_1$:N. If sort($x_1$:H) was sampled from $f_X(x)$, the system 600 would have that $$E[F_X(\text{sort}(x_i))] = \frac{i}{N}$$

for each i i∈1:N. The system 600 may average the sum of squared differences for each $F_X(\text{sort}(x_i))$] and their expectation $$\frac{i}{N}$$

to regularize X(θ) to be closer to $f_X(x)$:

$$\text{Loss}CDF = \frac{1}{N}\sum_{i=0}^{N}\left(\frac{i}{N} - CDF(\text{sort}(x_i))\right)^2$$

Summing for each considered feature gives the overall CDF-loss. Note that the system 600 may differentiate through the sorting operator by keeping the sorted indices and undoing the sorting operation for the calculated errors in the backward pass. This makes the whole loss term differentiable as long as the CDF function is differentiable.

The system 600 may use this CDF loss to match a feature to any PDF. For example, to encourage activations to be Gaussian, the system 600 could use the CDF of the Gaussian in the loss function. This could be useful for purposes similar to batch-normalization. Or the CDF could be a uniform distribution, which could help with weight or activation range fixed-point quantization.

Mode collapse during training is common because the gating functionality component may collapse to either being completely on, or completely off. Yet, for any batch of data, it is desirable for a feature to be both on and off to exploit the potential for conditionality. The system 600 may accomplish this by using the CDF-loss with a Beta distribution as a prior. The CDF $I_x(a, b)$ for the Beta distribution may be defined as:

$$B(x; a, b) = \int_0^x t^{a-1}(1-t)^{b-1}\,dt$$

$$I_x(a, b) = \frac{B(x; a, b)}{B(a, b)}$$

The system 600 may set a=0.6 and b=0.4 in some embodiments. The Beta-distribution may regularize gates towards being either completely on, or completely off.

The CDF-loss may encourage the system 600 to learn more conditional features. Some features of key importance, however, may be required to be executed at all times. The task loss (e.g., cross-entropy loss in a classification task, etc.) may send the necessary gradients to the gating functionality component to keep the corresponding gates always activated. On the other hand, it may also be beneficial to have gates that are always off.

Large neural networks may become highly over-parameterized, which may lead to unnecessary computation and resource use. In addition, such models may easily overfit and memorize the patterns in the training data, and could be unable to generalize to unseen data. This overfitting may be mitigated through regularization techniques.

$L_0$ norm regularization is an attractive approach that penalizes parameters for being different than zero without inducing shrinkage on the actual values of the parameters. An L0 minimization process for neural network sparsification may be implemented by learning a set of gates which collectively determine weights that could be set to zero. The system 600 may implement this approach to sparsify the output of the gating functionality component by adding the following complexity loss term:

$$L_C = \lambda \sum_{i=0}^{k} \sigma(\ln \pi_i)$$

where k is the total number of gates, $\sigma$ is the sigmoid function, and $\lambda$ is a parameter that controls the level of sparsification the system 600 is configured to achieve.

Introducing this loss too early in the training may reduce network capacity and potentially hurt performance. In the initial phase of training it is easier to sparsify network weights as they are far from their final states. This would, however, change the optimization path of the network and could be equivalent to removing some filters right at the start of training and continuing to train a smaller network. In some embodiments, the system 600 may be configured to introduce this loss after some delay allowing the weights to stabilize.

Figure 7:
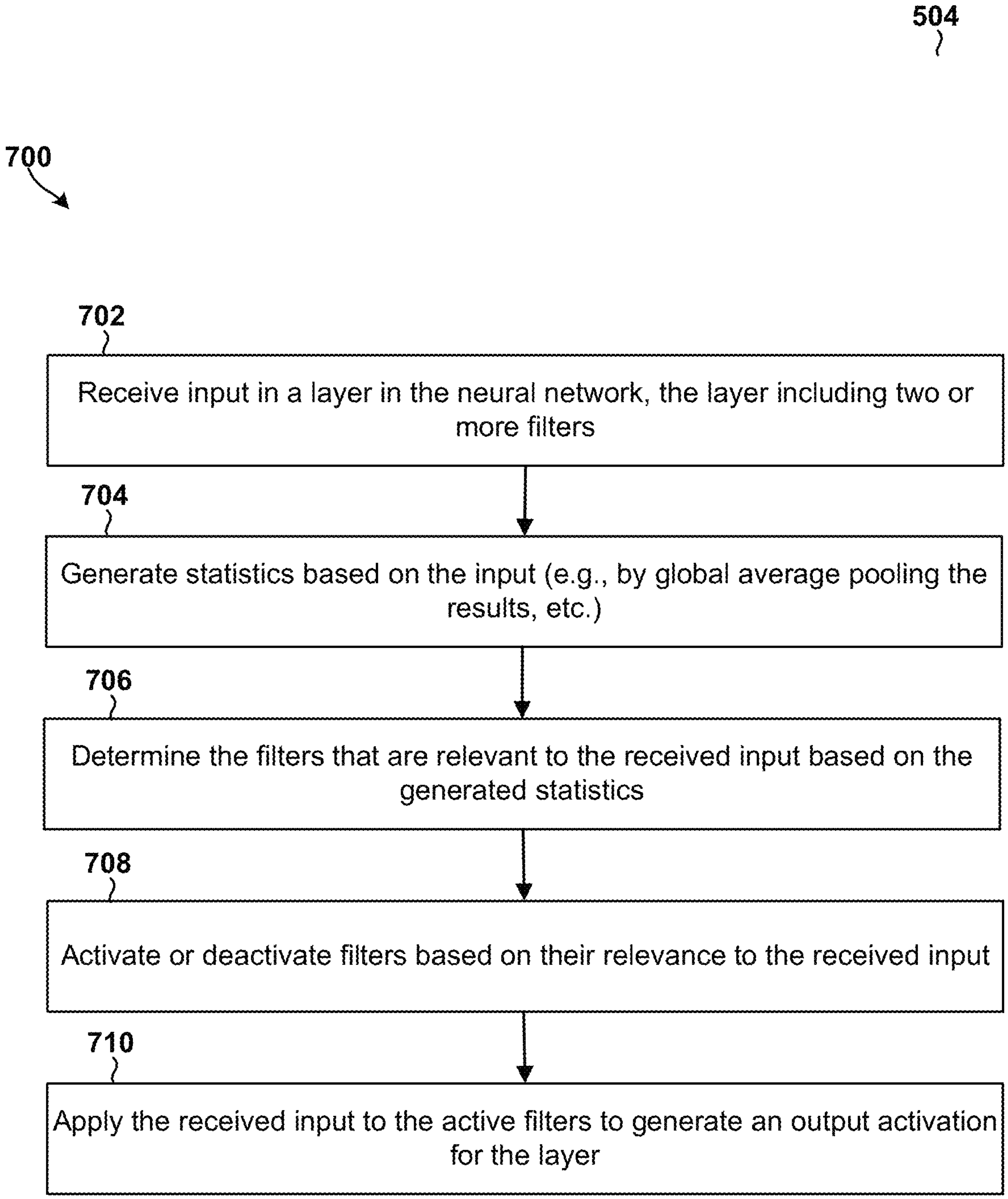
FIG. 7 is a process flow diagram illustrating a method of accomplishing conditional computation or gating in a neural network in accordance with an embodiment.

FIG. 7 illustrates a method 700 for accomplishing conditional computation or gating in a neural network in accordance with an embodiment. Method 700 may be performed by a processor in a computing system that implements all or portions of a neural network.

In block 702, the processor may receive input in a layer of the neural network that includes two or more filters.

In block 704, the processor may generate simple statistics based on the received input, such as by global average pooling the input to reduce the spatial dimensions of a three-dimensional tensor or otherwise reduce dimensionality in the input.

In block 706, the processor may identify or determine the filters that are relevant to the received input based on the generated statistics. For example, the processor may identify the filters that may be ignored without impacting the accuracy of the activation.

In block 708, the processor may activate or deactivate filters based on their relevance to the received input.

In block 710, the processor may apply the received input to the active filters to generate the output activation of the layer.

Figure 8:
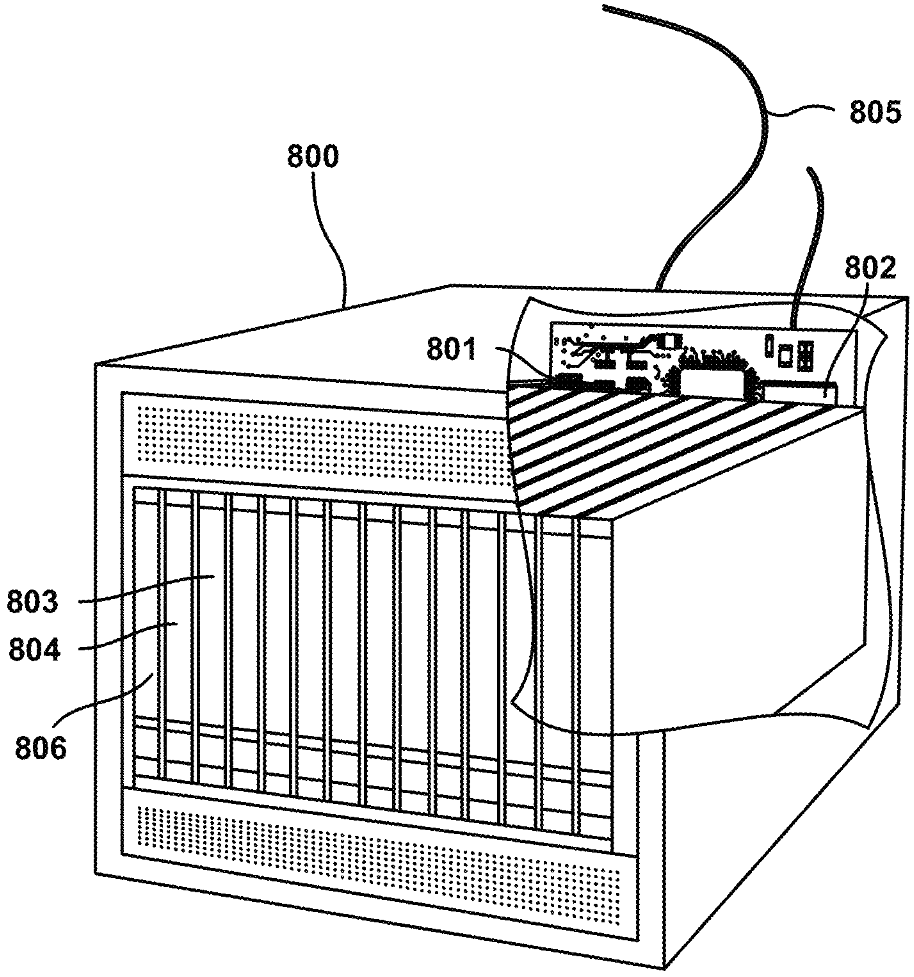
FIG. 8 is a component block diagram of server suitable for use with the various embodiments.

Various embodiments may be implemented on any of a variety of commercially available computing devices, such as a server 800 an example of which is illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other operator network computers and servers.

The processors may be any programmable microprocessor, microcomputer or multiple processor chip or chips that may be configured by software instructions (applications) to perform a variety of functions, including the functions of the various embodiments described in this application. In some wireless devices, multiple processors may be provided, such as one processor dedicated to wireless communication functions and one processor dedicated to running other applications. Typically, software applications may be stored in the internal memory 803 before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, functionality components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of activating gating within a current layer of a neural network that includes two or more filters, the method comprising:

receiving, by a processor in a computing device, a layer-specific input data that is specific to the current layer of the neural network;

generating statistics based on the received layer-specific input data, wherein generating the statistics comprises using global average pooling of the layer-specific input data to generate a global average pooling result;

using the generated statistics to assign a relevance to each of the two or more filters, wherein each assigned relevance indicates a relevance of a corresponding filter to the received layer-specific input data, wherein determining the relevance comprises applying the global average pooling result to a gating functionality of at least one filter of the two or more filters;

selectively activating or deactivating each of the two or more filters in the current layer based on the corresponding relevance by matching a distribution of an output of the gating functionality using a cumulative distribution function (CDF) loss function; and applying the received layer-specific input data to activated filters in the two or more filters to generate an output activation for the current layer of the neural network.

2. The method of claim 1, wherein the global average pooling reduces dimensionality of the received layer-specific input data.

3. The method of claim 1, wherein determining an activation status of each of the two or more filters in the current layer based on the corresponding relevance comprises implementing the gating functionality in a fully-connected two-layer Multilayer Perceptron (MLP) within the neural network, wherein the MLP is smaller than the neural network.

4. The method of claim 3, wherein implementing the gating functionality in the fully-connected two-layer MLP within the neural network comprises implementing the gating functionality without reliance on original input data.

5. The method of claim 3, wherein implementing the gating functionality in the fully-connected two-layer MLP within the neural network comprises using a complexity loss term based on L0 regularization to achieve network sparsity.

6. The method of claim 1, wherein the CDF loss function measures a sum of squared differences between expected and actual cumulative distributions of samples.

7. The method of claim 1, wherein each of the two or more filters in the layer are associated with a respective one of two or more gating functionality components.

8. The method of claim 7, further comprising enforcing conditionality on the gating functionality components by back propagating a loss function to approximate a discrete decision of at least one of the gating functionality components with a continuous representation, wherein back propagating the loss function comprises performing Batch-wise conditional regularization operations to match batch-wise statistics of one or more of the gating functionality components to a prior distribution.

9. The method of claim 1, wherein receiving the layer-specific input data that is specific to the current layer of the neural network comprises receiving a set of three-dimensional input feature maps that form a channel of input feature maps.

10. A computing device, comprising:

a processor configured with processor-executable instructions to:

receive a layer-specific input data that is specific to a current layer of a neural network that includes two or more filters;

generate statistics based on the received layer-specific input data, wherein generating the statistics comprises using global average pooling of the layer-specific input data to generate a global average pooling result;

use the generated statistics to assign a relevance to each of the two or more filters, wherein each assigned relevance indicates a relevance of a corresponding filter to the received layer-specific input data, wherein determining the relevance comprises applying the global average pooling result to a gating functionality of at least one filter of the two or more filters;

selectively activating or deactivating each of the two or more filters in the current layer based on the corresponding relevance by matching a distribution of an output of the gating functionality network using a cumulative distribution function (CDF) loss function; and apply the received layer-specific input data to activated filters in the two or more filters to generate an output activation for the current layer of the neural network.

11. The computing device of claim 10, wherein the global average pooling reduces dimensionality of the received layer-specific input data.

12. The computing device of claim 10, wherein the gating functionality is implemented in a fully-connected two-layer Multilayer Perceptron (MLP) within the neural network, wherein the MLP is smaller than the neural network.

13. The computing device of claim 12, wherein the processor is configured to implement the gating functionality in the fully-connected two-layer MLP within the neural network by implementing the gating functionality without reliance on original input data.

14. The computing device of claim 12, wherein the processor is configured to implement the in the fully-connected two-layer MLP within the neural network by using a complexity loss term based on L0 regularization to achieve network sparsity.

15. The computing device of claim 10, wherein the processor is configured to use the CDF loss function, wherein the CDF loss function measures a sum of squared differences between expected and actual cumulative distributions of samples.

16. The computing device of claim 10, wherein each of the two or more filters in the layer are associated with a respective one of two or more gating functionality components and the processor is further configured to enforce conditionality on the gating functionality components by back propagating a loss function to approximate a discrete decision of at least one of the gating functionality components with a continuous representation, wherein back propagating the loss function includes performing Batch-wise conditional regularization operations to match batch-wise statistics of one or more of the gating functionality components to a prior distribution.

17. The computing device of claim 10, wherein the processor is configured to receive the layer-specific input data that is specific to the current layer of the neural network by receiving a set of three-dimensional input feature maps that form a channel of input feature maps.

18. A non-transitory processor-readable storage medium having stored thereon processor-executable instructions to cause a processor in a computing device to activate gating within a current layer of a neural network that includes two or more filters and perform operations comprising:

receiving, by a processor in a computing device, a layer-specific input data that is specific to the current layer of the neural network;

generating statistics based on the received layer-specific input data, wherein generating the statistics comprises using global average pooling of the layer-specific input data to generate a global average pooling result;

using the generated statistics to assign a relevance to each of the two or more filters, wherein each assigned relevance indicates a relevance of a corresponding filter to the received layer-specific input data, wherein determining the relevance comprises applying the global average pooling result to a gating functionality of at least one filter of the two or more filters;

selectively activating or deactivating each of the two or more filters in the current layer based on the corresponding relevance by matching a distribution of an output of the gating functionality using a cumulative distribution function (CDF) loss function; and applying the received layer-specific input data to activated filters in the two or more filters to generate an output activation for the current layer of the neural network.

* * * * *